(12) United States Patent
Ogihara (10) Patent No.: US 6,795,240 B2
(45) Date of Patent: Sep. 21, 2004

(54) MICROSCOPE SYSTEM (75) Inventor: Yasushi Ogihara, Yokohama (JP)

(73) Assignee: Nikon Corporation, Tokyo (JP)

( * ) Notice: Subject to any disclaimer, the term of this patent is extended or adjusted under 35 U.S.C. 154(b) by 213 days.

(21) Appl. No.: 10/195,717

(22) Filed: Jul. 16, 2002

(65) Prior Publication Data

US 2003/0011883 A1 Jan. 16, 2003

(30) Foreign Application Priority Data

Jul. 16, 2001 (JP) .......................................... 2001-214601

(51) Int. Cl.[7] .............................................. G02B 21/26
(52) U.S. Cl. ..................................... 359/393; 359/381
(58) Field of Search ................................. 359/391–393, 359/381–383, 363, 368; 250/234, 201.03

(56) References Cited

U.S. PATENT DOCUMENTS 6,628,459 B2 * 9/2003 Ue .............................. 359/392

FOREIGN PATENT DOCUMENTS

JP 2001-42223 2/2001

OTHER PUBLICATIONS

U.S. 2002/0060842 A1, May 23, 2002.*

* cited by examiner

Primary Examiner—James Phan (57) ABSTRACT

A microscope system includes: a stage that shifts a specimen in x and y directions; a detection section that detects a position of the stage after shifting; a reception section that receives an input of a shift target position for the stage inputted by an observer; an optical system that forms a light flux into a focused and magnified image of the specimen; an image capturing section that captures the magnified image; and a shift section that, if the position detected by the detection section and the shift target position received by the reception section do not agree with one another, shifts a relative positional relationship between the light flux and the image capturing section.

9 Claims, 10 Drawing Sheets

MICROSCOPE SYSTEM

INCORPORATION BY REFERENCE

The disclosure of the following priority application is herein incorporated by reference: Japanese Patent Application No. 2001-214601, filed Jul. 16, 2001.

BACKGROUND OF THE INVENTION

1. Field of the Invention

The present invention relates to a microscope system which is equipped with a stage.

2. Description of Related Art

In a microscope which is equipped with an electrically driven stage, methods of setting the position of the electrically driven stage can broadly be classified into two categories.

The first method is an open loop control method. In this method, the rotational amount for the motor required in order to arrive at the target point is calculated in advance, and the motor is rotated based thereupon. Generally a stepping motor is used.

The second method is a closed loop control method. In this method, a sensor such as a linear encoder or the like is provided separately from the drive motor for detecting the position of the stage, and the motor is driven while comparing the present position with a target point, until the position of the target point is arrived at.

When setting the position of an electrically driven stage, generally the position upon the image monitor to which the observer has tried to shift, i.e. the so called 'shift target position', and the position when the system has actually completed shifting, i.e. the so called 'stage position', do not perfectly agree with one another. As a result, a minute error exists between these two positions. Even though the error between the shift target position and the stage position may be a minute amount upon the surface of the object under examination, if the observation magnification is great, this becomes a great difference upon the display means such as a monitor or the like, and it can happen that the field of observation intended by the observer is not necessarily always attained. For example, if the shift amount accuracy of the stage is ±10 microns with regard to the shift target position in case that the magnification of the objective lens is 100 and the size of the CCD is a third inch (diagonal dimension: 6 mm), the error amount is 0.01 mm upon the surface of the object. However, the error amount becomes 1 mm on the image-capturing surface of the CCD, which corresponds to a sixth of the diagonal dimension on the monitor. In particular, with an electrically driven stage which utilizes the above described open loop control method, its construction and control are simple and low in cost. However, since only the rotational amount of the motor is controlled, errors can easily occur due to backlash of the lead screw or the like when the rotational amount of the motor is converted to the shift amount of the stage, and it becomes difficult to enhance the accuracy of positioning. Due to this, errors can easily occur between the shift target position and the stage position.

On the other hand, with the above described closed loop control method, the position of the stage is detected in real time by the position detection sensor such as a linear encoder or the like, and it is possible to perform positioning while correcting the position of the stage until the difference from the shift target position is within a permitted range which is specified in advance. Due to this, it is possible to perform positioning at comparatively high accuracy. However, when a quite high positioning accuracy is demanded, so called hunting can take place in which the stage oscillates around the shift target position, since the permitted range described above is small. As a result the positioning may consume a considerable amount of time, and the phenomenon may even occur of the hunting continuing indefinitely.

SUMMARY OF THE INVENTION

The present invention proposes a microscope system which can display an image of the target position at high speed and with high accuracy.

A microscope system according to the present invention, comprises: a stage that shifts a specimen in x and y directions; a detection section that detects a position of the stage after shifting; a reception section that receives an input of a shift target position for the stage inputted by an observer; an optical system that forms a light flux into a focused and magnified image of the specimen; an image capturing section that captures the magnified image; and a shift section that, if the position detected by the detection section and the shift target position received by the reception section do not agree with one another, shifts a relative positional relationship between the light flux and the image capturing section.

DESCRIPTION OF THE PREFERRED EMBODIMENTS

Preferred embodiments of the present invention will now be explained with reference to the drawings.

First Embodiment

A microscope system equipped with an electrically driven stage according to the first preferred embodiment of the present invention will be explained with reference to FIGS. 1, 2, 5, 6, 8, 9A, and 9B.

Figure 1:
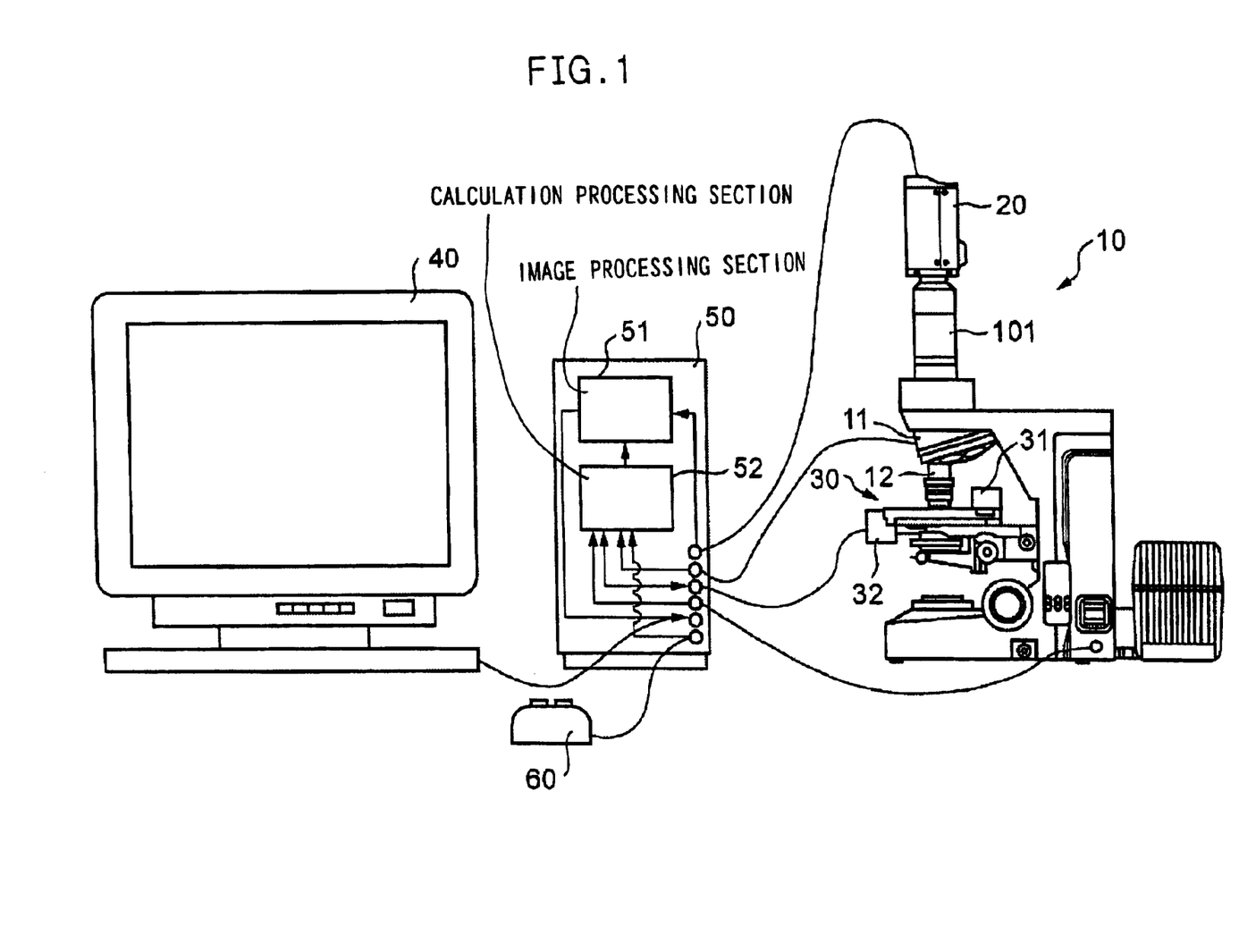
FIG. 1 is an explanatory figure showing the entire structure of a microscope system which is a first preferred embodiment of the present invention.
Figure 2:
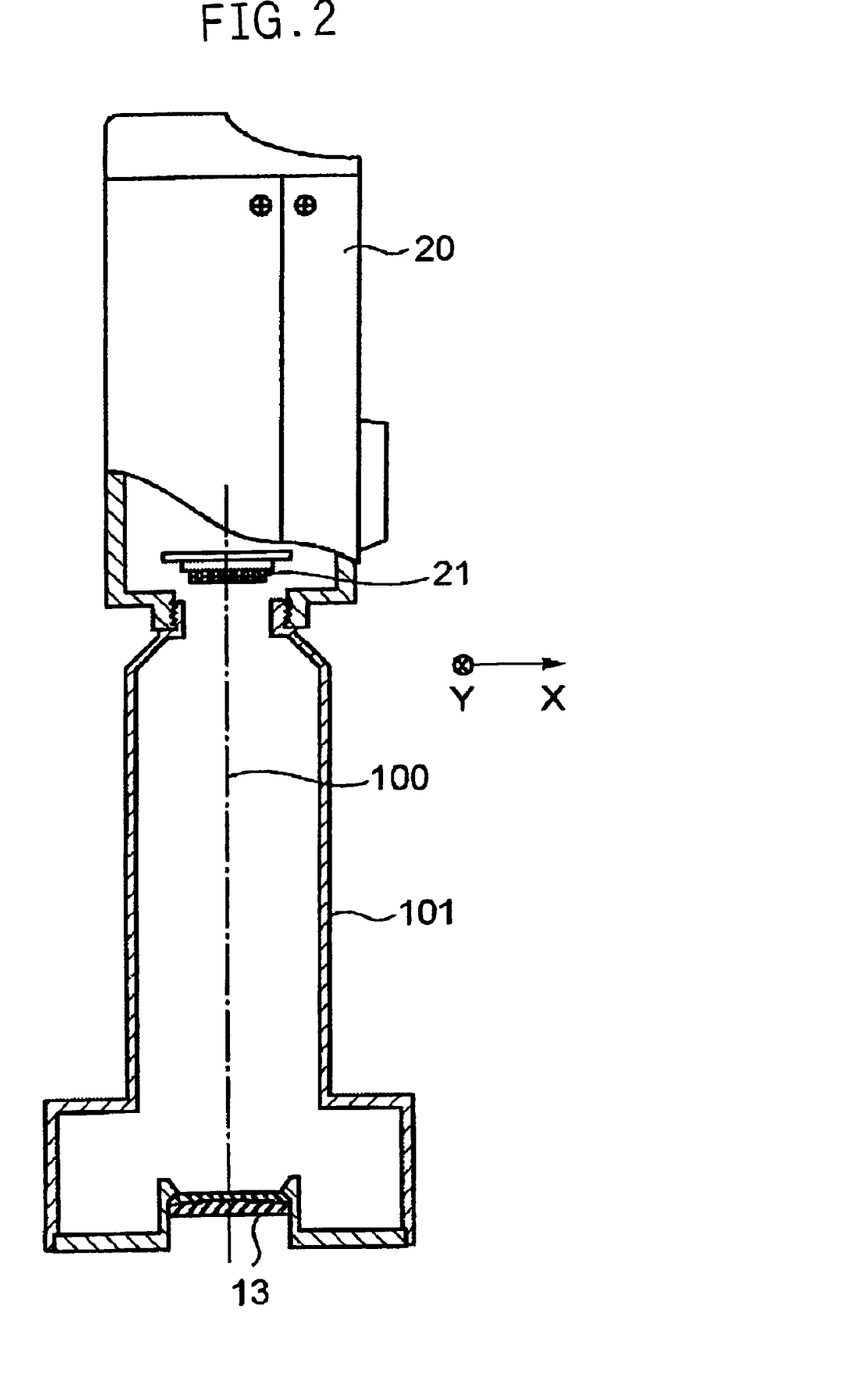
FIG. 2 is a cutaway sectional figure showing the structure around a CCD 21 which is incorporated in this microscope system according to the first preferred embodiment of the present invention.

This microscope system comprises a microscope 10, a control device 50, and a monitor 40. The microscope 10 comprises an electrically driven stage 30, a revolver 11, an objective lens 12, a barrel 101, and a TV camera 20. The TV camera 20 is connected to the upper portion of a barrel 101. As shown in FIG. 2, this TV camera 20 comprises a CCD 21 as an image capturing element. A focusing lens 13 is disposed within the barrel 101 for focusing an observed image of the specimen into an image upon the CCD 21. The control device 50 comprises an image processing section 51 and a calculation processing section 52, and the output of the CCD 21 is inputted to the image processing section 51. The revolver 11 and the electrically driven stage 30 are connected to the calculation processing section 52. Furthermore, a mouse 60 and a monitor 40 are connected to the control device 50.

Figure 9A:
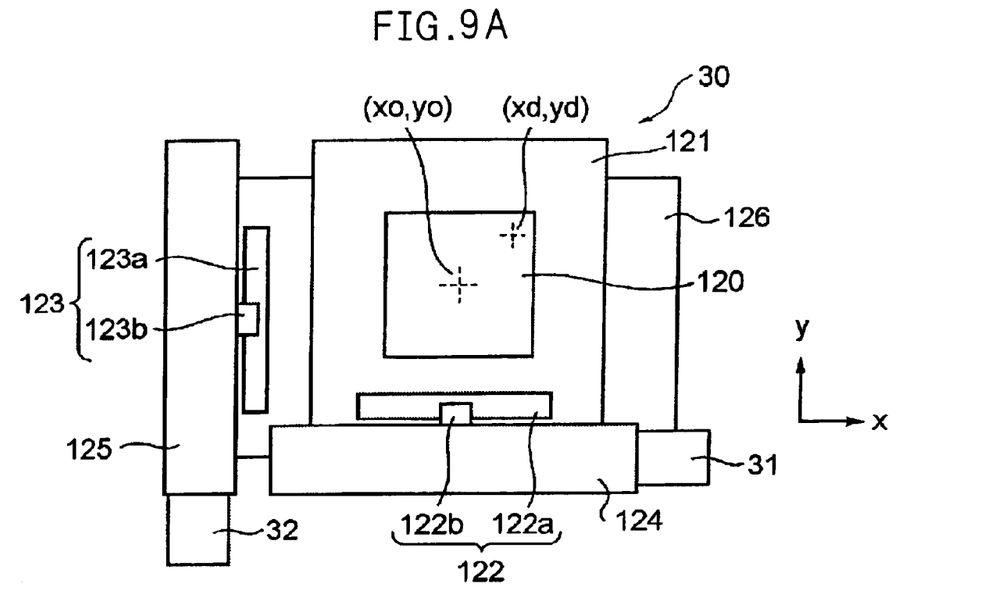
FIG. 9A is an explanatory figure for showing the structure of an electrically driven stage 30 of the microscope system according to the first preferred embodiment of the present invention, before shifting.

The electrically driven stage 30 comprises an x stage 121 for carrying the specimen 120 as shown in FIG. 9A, a stepping motor 31 and a lead screw section 124 for shifting the x stage 121 in the x direction, a y stage 126 which carries the x stage 121, and a stepping motor 32 and a lead screw section 125 for shifting the y stage 126 in the y direction. Furthermore, respective linear scales 122a and 123a of linear encoders 122 and 123 are connected to the x stage 121 and to the y stage 126, respectively. And respective sensors 122b and 123b of the linear encoders 122 and 123 are fitted to the lead screw sections 124 and 125, respectively. The rotational motion of the stepping motors 31 and 32 is converted into rectilinear motion by lead screws (not particularly shown) of the lead screw sections 124 and 125 respectively, and thereby the x stage 121 and the y stage 126 are respectively driven in the x direction and in the y direction (refer to FIG. 9B). At this time, the sensors 122b and 123b detect the positions of the linear scales 122a and 123a, respectively. In this manner, the (x, y) coordinates of the x and y stages 121 and 126 are detected. The stepping motors 31 and 32 are connected to the calculation processing section 52, and operate according to rotational amounts which are commanded by the calculation processing section 52. Furthermore, the outputs of the sensors 122b and 123b are inputted to the calculation processing section 52.

Figure 5:
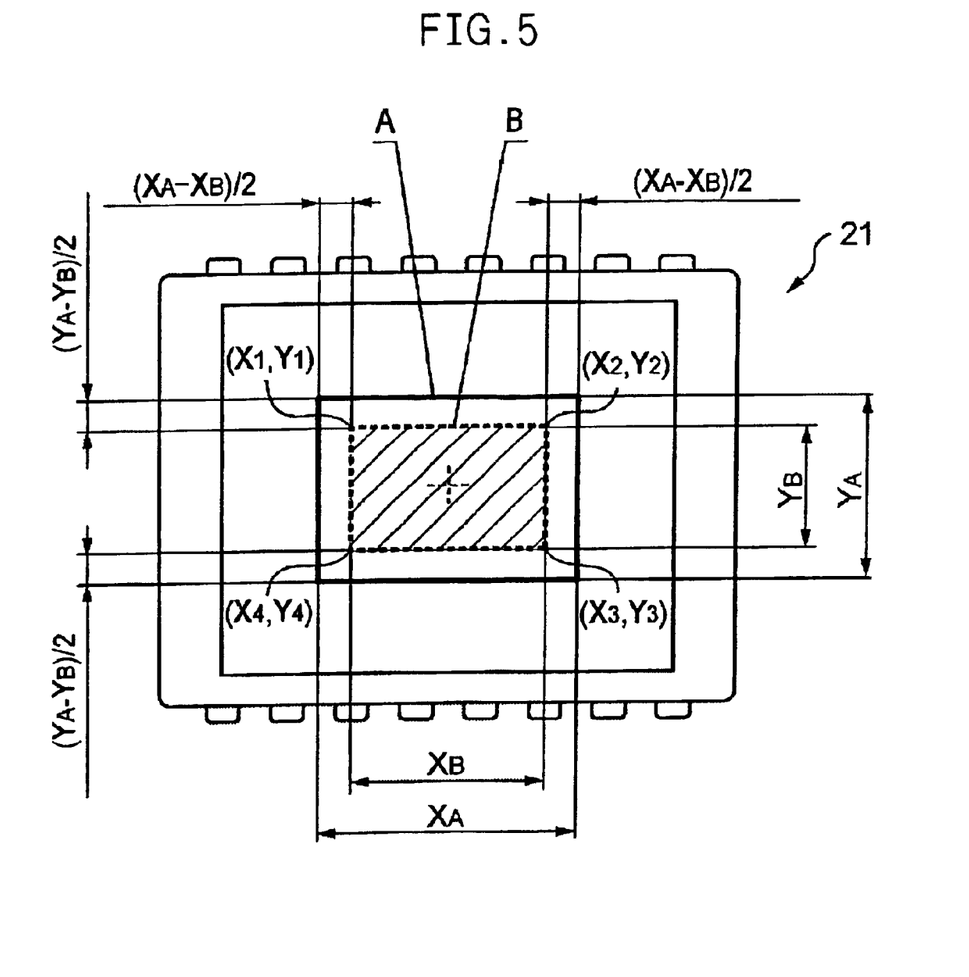
FIG. 5 is an explanatory figure showing the positional relationship between an effective pixel range A and a display pixel range B of the CCD 21 incorporated in the microscope system according to the first preferred embodiment of the present invention.

As shown in FIG. 5, the CCD 21 has an effective pixel range A over which the image capturing pixels are arranged vertically and horizontally. The CCD 21 is capable of capturing an image of an observation image which has been focused upon this effective pixel range A. The output of the CCD 21 is inputted to the image processing section 51. The image processing section 51 outputs an image within a display pixel range B which is surrounded by the four coordinate points (X1, Y1), (X2, Y2), (X3, Y3) and (X4, Y4) which are determined upon in advance within the effective pixel range A, to the monitor 40 so as to display it.

The revolver 11 is provided with a plurality of holes for attachment of objective lenses, so that a plurality of objective lenses can be fitted thereto. A sensor (not particularly shown) is provided within the revolver 11 for detecting the rotation angle of the revolver 11. The output of this sensor is inputted to the calculation processing section 52 of the control device 50. The calculation processing section 52 stores in an internal memory a table which establishes in advance a correspondence between the addresses assigned to the plurality of objective lens attachment holes and the outputs of the sensor. Furthermore, in this table, there is also included information which establishes a correspondence between the addresses assigned to the objective lens attachment holes, and the observation magnifications M which are the results of multiplying the magnifications of the objective lenses which are fitted to those objective lens attachment holes by the magnifications of the focusing lens 13 and of other lenses such as relay lenses and the like. By consulting the above described table, the calculation processing section 52 identifies the address of the objective lens attachment hole which is currently upon the optical axis from the rotation angle which is outputted from the sensor, and is able to obtain the observation magnification M therefrom.

Figure 8:
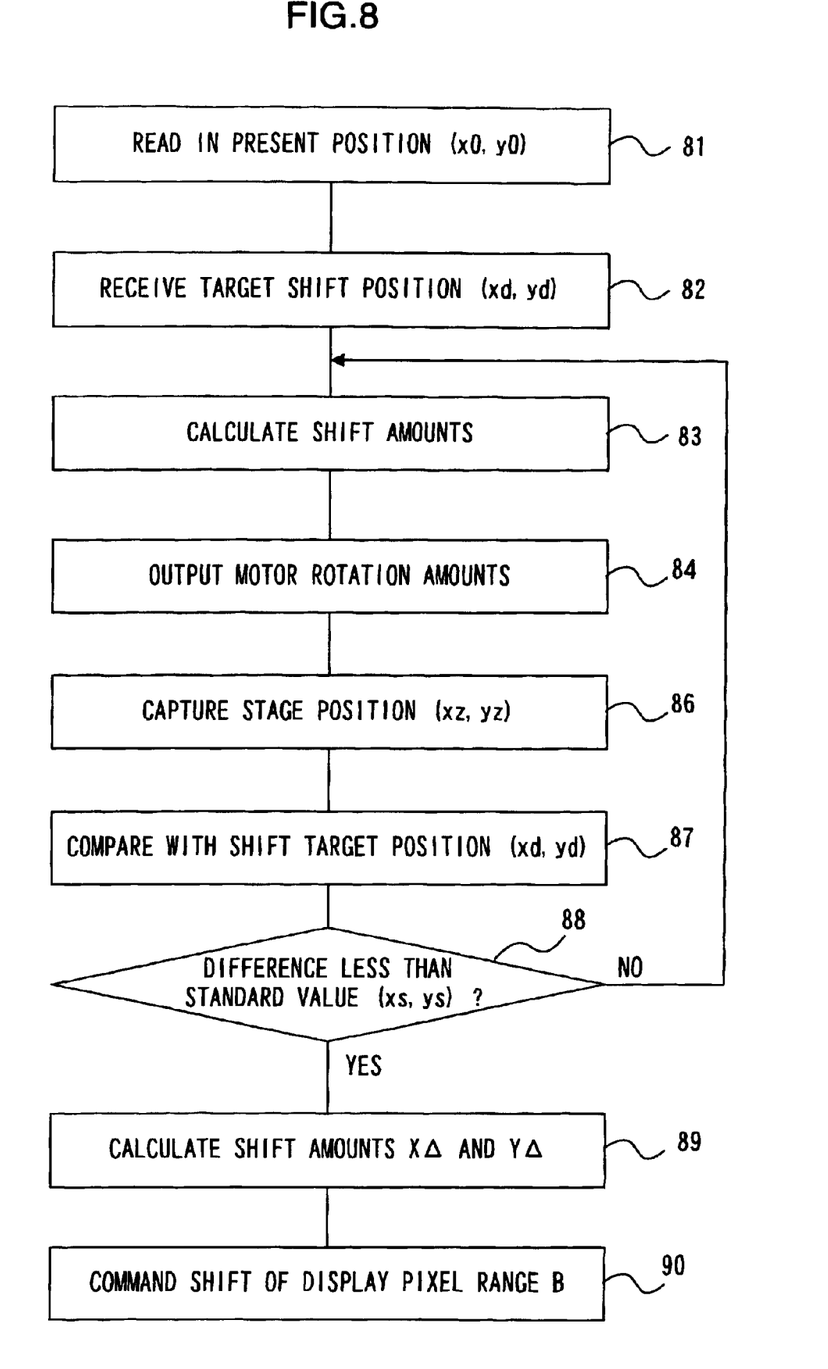
FIG. 8 is a flow chart showing the operation of a calculation processing section of the microscope system according to the first preferred embodiment of the present invention, when the displayed image is being shifted.

The calculation processing section 52 controls the electrically driven stage 30 according to the flow chart of FIG. 8 by reading in a program stored in its internal memory and executing it. First, in a step 81, the calculation processing section 52 reads in the present position (x0, y0) via the linear encoders 122 and 123. Next, a display is provided upon the monitor 40 in order to urge the observer to input a shift target position (xd, yd) on the specimen 120. And, in a step 82, a target position is received from the observer by designation according to a clicking action of the mouse 60 upon the display image which is being presented upon the monitor 40. Furthermore, the observation magnification M is obtained by looking up in the table in the memory with the rotation angle of the revolver 11 which has been received from the sensor. Then, also in the step 82, the shift target position upon the monitor is converted into the coordinates (xd, yd) of the target position upon the specimen 120 (upon the electrically driven stage 30) from this observation magnification M and the target position upon the monitor. Next, the values xM=(xd−x0) and yM=(yd−y0) are calculated from the present position (x0, y0) and from the target position (xd, yd) which have been obtained in the steps 81 and 82 described above, and the shift amounts xM and yM for the electrically driven stage 30 are obtained (in the step 83).

It should be understood that, the present position means the position according to the x, y coordinates of the specimen, which is being displayed at present, corresponding to a predetermined position upon the screen of the monitor 40 (for example the center of the screen). The present position before shifting is the position (x0, y0) according to the above description. And, the target position (xd, yd) means the position in the present x, y coordinates which the observer desires to shift to the predetermined position upon the screen of the monitor 40 (for example the center of the screen).

Figure 9B:
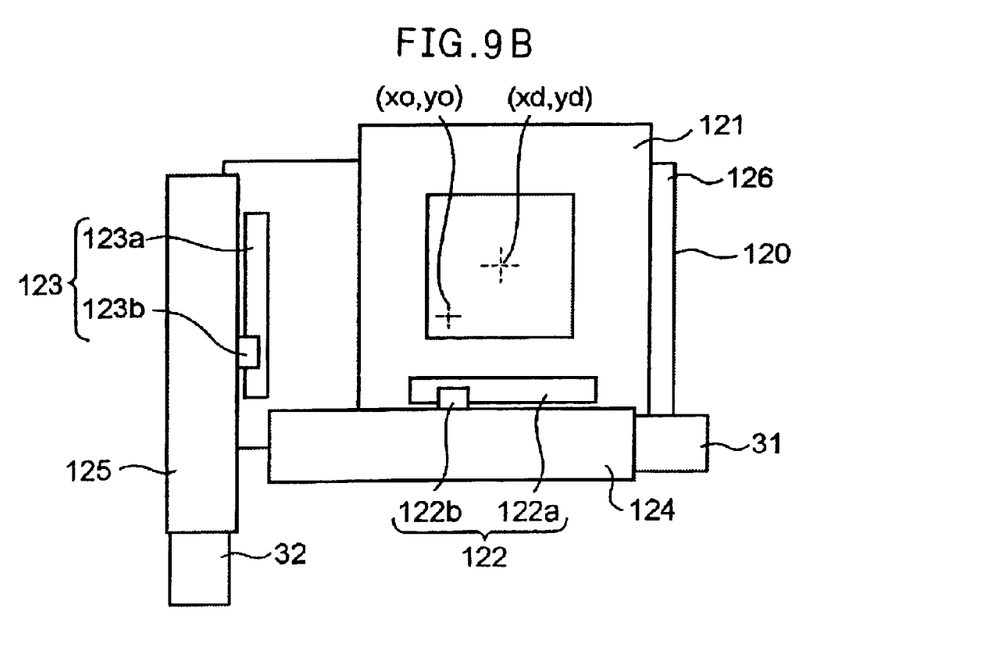
FIG. 9B is an explanatory figure for showing the structure of an electrically driven stage 30 of the microscope system according to the first preferred embodiment of the present invention, after shifting.

The rotational amounts for the stepping motors 31 and 32 which correspond to the obtained shift amounts xM and yM are calculated using a ratio between stage shifting amount and motor rotational amount which has been obtained in advance and stored, and the rotational amounts which are obtained are outputted to the stepping motors 31 and 32, in the step 84. By doing this, the stepping motors 31 and 32 are rotated by just the rotational amounts which have been designated, and this rotational motion is converted into rectilinear motion by the lead screws incorporated in the lead screw sections 124 and 125, and thereby the x stage 121 and the y stage 126 are driven in the x direction and the y direction, respectively (FIGS. 9A and 9B). After this driving has been completed, the calculation processing section 52 captures the present position (xz, yz) for a second time from the linear encoders 122 and 123 in the step 86, compares it with the shift target position (xd, yd) in the step 87, and determines, in the step 88, whether or not its difference ((xz−xd), (yz−yd)) from the shift target position (xd, yd) is less than a standard value (xs, ys) which is determined in advance; i.e., it evaluates the conditions xs>(xz−xd) and ys>(yz−yd). If this difference is greater than the standard value (xs, ys) the flow of control returns to the step 83, and the electrically driven stage 30 is driven for a second time to shift it. On the other hand, if the difference is less than the standard value (xs, ys), then the flow of control proceeds to the step 89, in which the shift amount for the display image is calculated according to the following calculation equations. That is, it may be the case that the difference is less than the standard value (xs, ys), but that an error greater than a predetermined value is present. M in the calculation equations below is the observation magnification M which was obtained in the step 82.

$$X\Delta=(xd-xz)\times M$$

$$Y\Delta=(yd-yz)\times M$$

Figure 6:
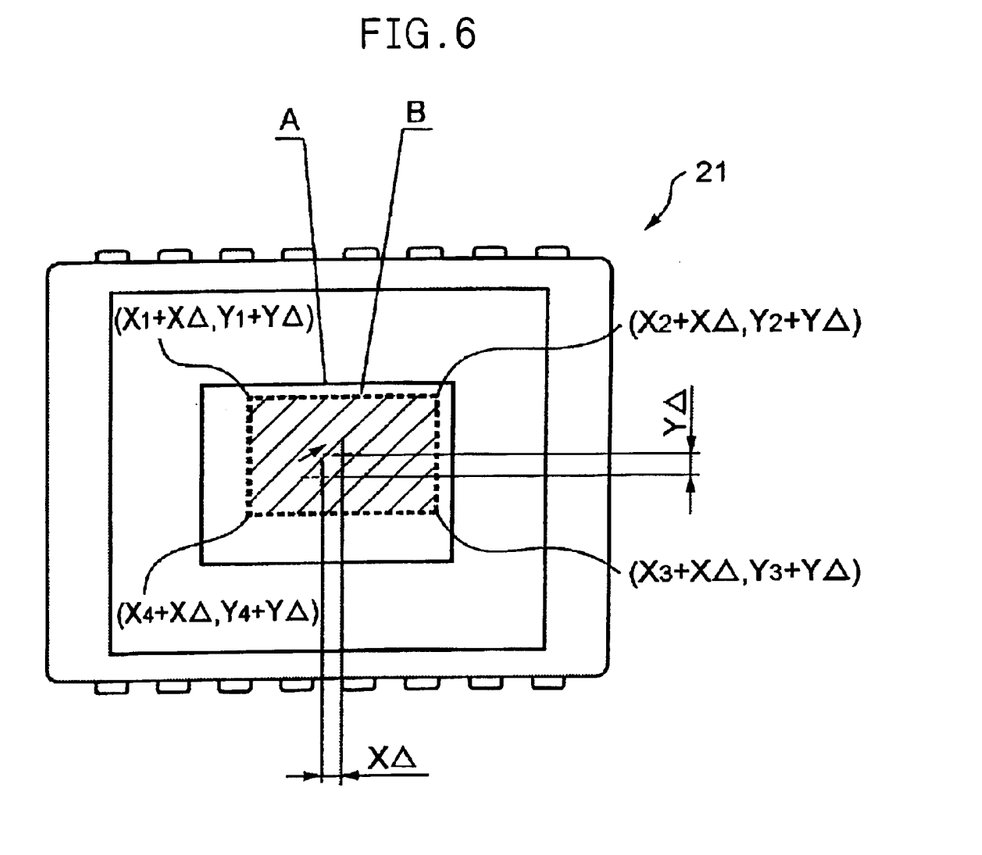
FIG. 6 is an explanatory figure showing the positional relationship after shifting between the positional relationship between the effective pixel range A and the display pixel range B of the CCD 21 incorporated in the microscope system according to the first preferred embodiment of the present invention.

Finally, in the step 90, the calculation processing section 52 commands the image processing section 51 to shift the four coordinates (X1, Y1), (X2, Y2), (X3, Y3), and (X4, Y4) which determine the region of the display pixel range B by the amounts XΔ, YΔ which were obtained in the step 89. Due to this, as shown in FIG. 6, the image processing section 51 outputs to the monitor 40 and displays, as the display pixel range B after shifting, the image in a region which is surrounded by the four coordinates (X1+XΔ, Y1+YΔ), (X2+XΔ, Y2+YΔ), (X3+XΔ,Y3+YΔ), and (X4+XΔ, Y4+YΔ). Due to this, the remaining error xd−xz, yd−yz upon the object plane (the surface of the specimen) is corrected upon the image plane, and an image which is centered upon the target position (xd, yd) is displayed upon the monitor 40.

It should be understood that there is an upper limit upon the shift amounts XΔ and YΔ, since the possible shift range of the CCD 21 for the display pixel range B is the effective pixel range A of the CCD 21. Due to this, the above described standard values xs and ys are set as the upper limits for the shift amounts XΔ and YΔ. By doing this, if the difference between the present position (xz, yz) and the shift target position (xd, yd) is less than the values xs and ys which can be handled by shifting of the display pixel range B, then it is handled by shifting the display pixel range B; while, on the other hand, if the difference is greater than the values xs and ys, then the flow of control returns from the step 88 to the step 83 and the electrically driven stage 30 is shifted again. As a result, it is possible to display an image centered upon the shift target position (xd, yd) with good efficiency. It should be understood that, if the widths in the X and Y directions of the effective pixel range A are given by XA and YA, and the widths in the X and Y directions of the display pixel range B are given by XB and YB, then the upper limits for the shift amounts XΔ and YΔ are given as below (refer to FIG. 5). The X and Y directions upon the CCD 21 correspond to the x and y directions of the electrically driven stage 30.

(Upper limit for XΔ)=(XA−XB)/2

(Upper limit for YΔ)=(YA−YB)/2

Accordingly, by setting the standard values xs and ys according to:

$$xs=(XA-XB)/2M$$

$$ys=(YA-YB)/2M$$

it is possible to display at high efficiency an image with the shift target position (xd, yd) centered. It should be understood that the above described standard values xs and ys could also be defined as the minimum unit amounts of the shift control amounts for the electrically driven stage 30.

Figure 7:
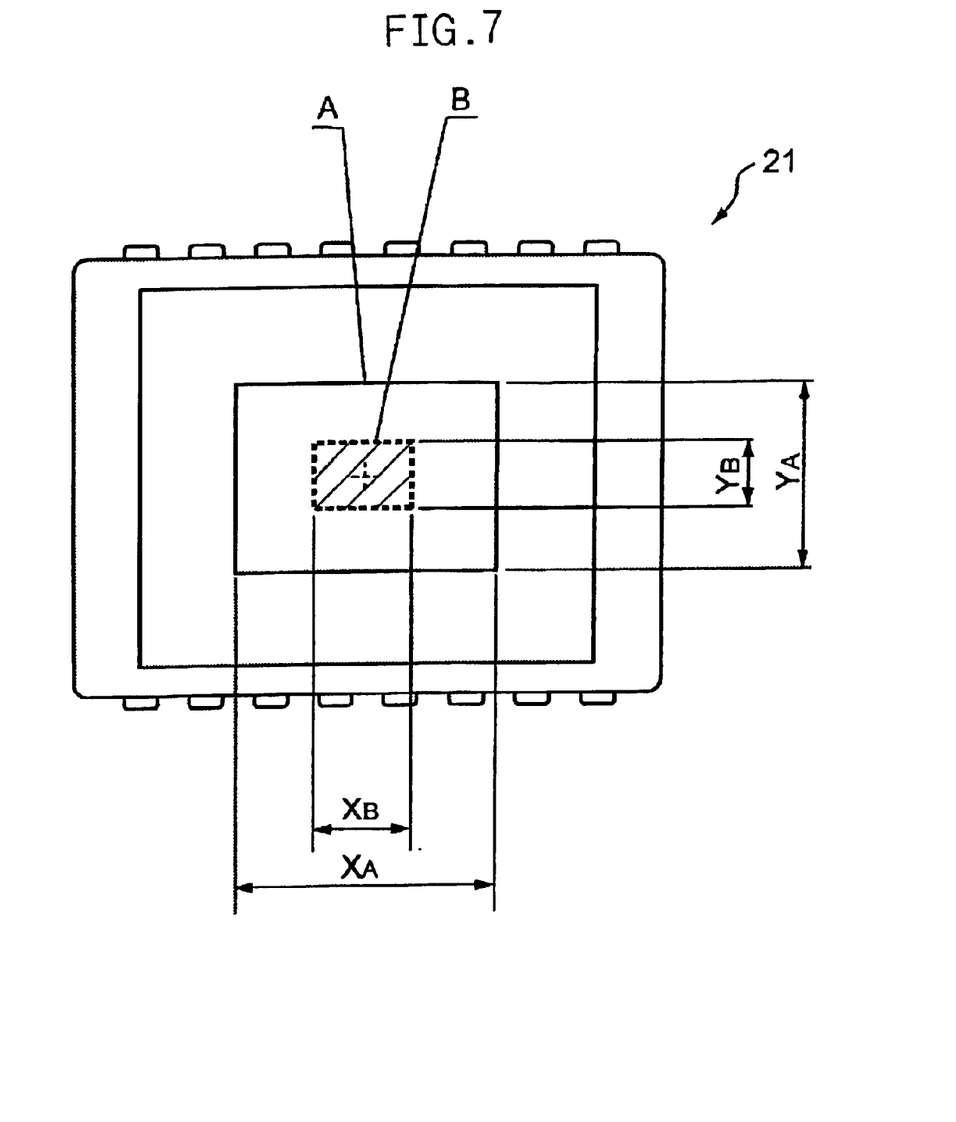
FIG. 7 is an explanatory figure showing the positional relationship between the positional relationship between the effective pixel range A and the display pixel range B of the CCD 21 incorporated in the microscope system according to the first preferred embodiment of the present invention, when electronic zoom is being employed.

It should be understood that, when the image processing section 51 is displaying an image upon the monitor 40, it is also possible simultaneously to implement electronic zooming so as to magnify the image at a magnification determined in advance. In this case, the magnification of the electronic zooming is superimposed upon the above described observation magnification M. Furthermore, when utilizing this electronic zooming, if for example an electronic zoom of 2× is assumed, then the display pixel range B is smaller than the display pixel range A when using an electronic zoom of 1×, as shown in FIG. 7, and it is possible to take the shift amounts XΔ and YΔ greater. Accordingly, if electronic zooming is utilized, the method according to this preferred embodiment for shifting the specimen image by shifting the observation image side is very effective, since it is possible to take the shift amounts XΔ and YΔ greater. Moreover, if electronic zooming is utilized, it is desirable to prepare the standard values xs and ys for each electronic zooming magnification in advance.

Second Embodiment

Figure 3:
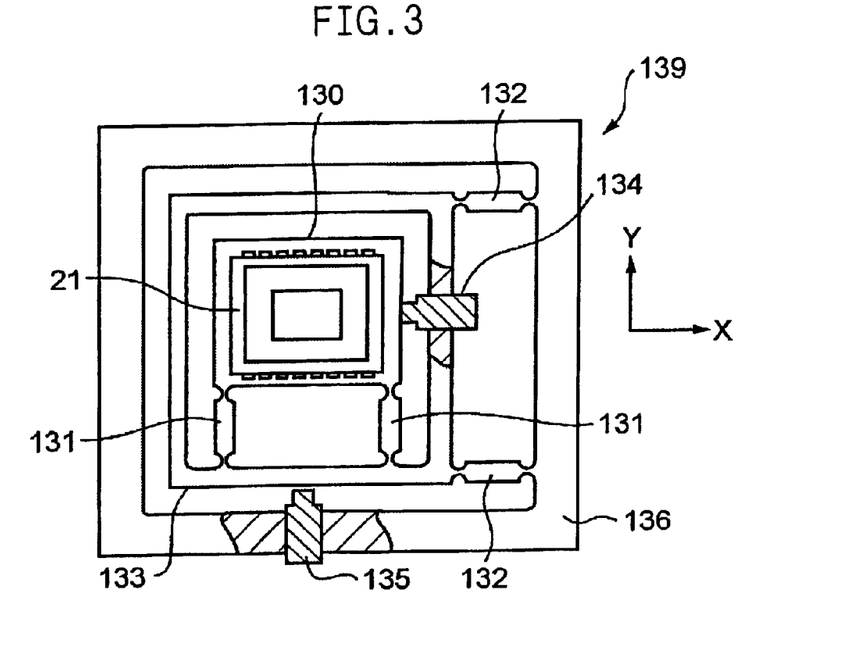
FIG. 3 is a plan view showing the structure of an actuator 139 which carries a CCD 21 incorporated in a microscope system according to a third preferred embodiment of the present invention.

The second preferred embodiment of the microscope system of the present invention has a structure in which the CCD 21 is carried upon an actuator 139 as shown in FIG. 3, and the CCD 21 can itself be physically shifted in the X and Y directions, so as to shift the image which is being displayed upon the monitor 40 in the X and Y directions. It should be understood that the X and Y directions of the CCD 21 correspond to the x and y directions of the electrically driven stage 30. Accordingly, with this second preferred embodiment, in the step 90 of the flow chart for the first preferred embodiment shown in FIG. 8, instead of shifting the display pixel range B, piezo elements 134 and 135 which are the drive sources for the actuator 139 are driven, and the CCD 21 itself is shifted by just the amounts XΔ and YΔ.

The actuator 139 comprises an X plate 130 which is formed by processing a flexible plate shaped member as shown in FIG. 3 by wire cutting, a Y plate 133 which supports the X plate 130 in cantilever fashion by two plate springs 131, and a main body 136 which supports the Y plate 133 in cantilever fashion by two plate springs 132. The CCD 21 is carried upon the X plate 130. The lengthwise direction of the plate spring 131 is the Y direction, and the lengthwise direction of the plate spring 132 is the X direction. A piezo element 134 which can expand and contract in the X direction is disposed at the side surface of the X plate 130. This piezo element 134 is supported by the Y plate 133. Furthermore, a piezo element 135 which can expand and contract in the Y direction is disposed at the side surface of the Y plate 133. This piezo element 135 is supported by the main body 136. Thus the X plate 130 is shifted in the X direction when the piezo element 134 expands according to command by the calculation processing section 52, and similarly the Y plate 133 (together with the X plate 130) is shifted in the Y direction when the piezo element 135 expands. Due to this, it is possible to shift the CCD 21 by exactly XΔ and YΔ.

With this second preferred embodiment, up through the calculation of the shift amounts XΔ and YΔ in the step 89 of FIG. 8, the operations of the various elements are the same as in the first preferred embodiment. However, in the step 90, the calculation processing section 52 extends the piezo elements 134 and 135 of the actuator 139 and shifts the CCD 21 itself in the X and Y directions, so that the remaining error (xd−xz), (yd−yz) upon the specimen 120 (the object plane) is corrected. By doing this, an image centered upon the target position (xd, yd) which has been inputted by the observer is projected upon the monitor 40.

Figure 4:
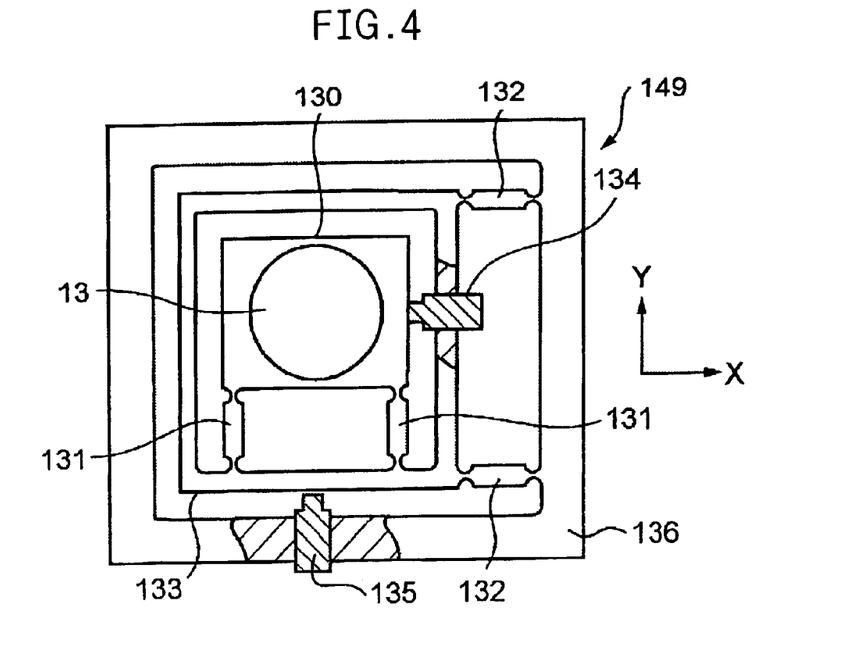
FIG. 4 is an explanatory figure showing the structure of an actuator 149 which carries a focusing lens 13 incorporated in a microscope system according to a fourth preferred embodiment of the present invention.

With the structure of this second embodiment, the display pixel range B of the CCD 21 can be made to be the same range as the effective pixel range A. Accordingly, since all of the pixels of the CCD 21 can be utilized, it is beneficial from the point of view of picture quality, Third Embodiment The third preferred embodiment of the microscope system according to the present invention has a structure in which the focusing lens 13 is carried upon an actuator 149 as shown in FIG. 4, and, by shifting the focusing lens 13 in the X and Y directions, the image which is focused upon the CCD 21 is itself shifted in the X and Y directions. By doing this, the image which is being displayed upon the monitor 40 is shifted in the X and Y directions. The structure of the actuator 149 is the same as that of the actuator 139 of the second preferred embodiment described above, and accordingly its explanation will be curtailed.

Accordingly, with this third preferred embodiment as well, just as with the second preferred embodiment described above, up through the step 89 of the flow chart of FIG. 8, the operation is the same as in the first preferred embodiment; but in the step 90, instead of shifting the display pixel range B, the calculation processing section 52 drives the piezo elements 134 and 135 which are the drive sources for the actuator 149 to shift the focusing lens 13 itself in the X and Y directions, so that the observation image upon the CCD 21 is shifted. By doing this, an image centered upon the target position (xd, yd) which has been inputted by the observer is projected upon the monitor 40.

Fourth Embodiment

Figure 10:
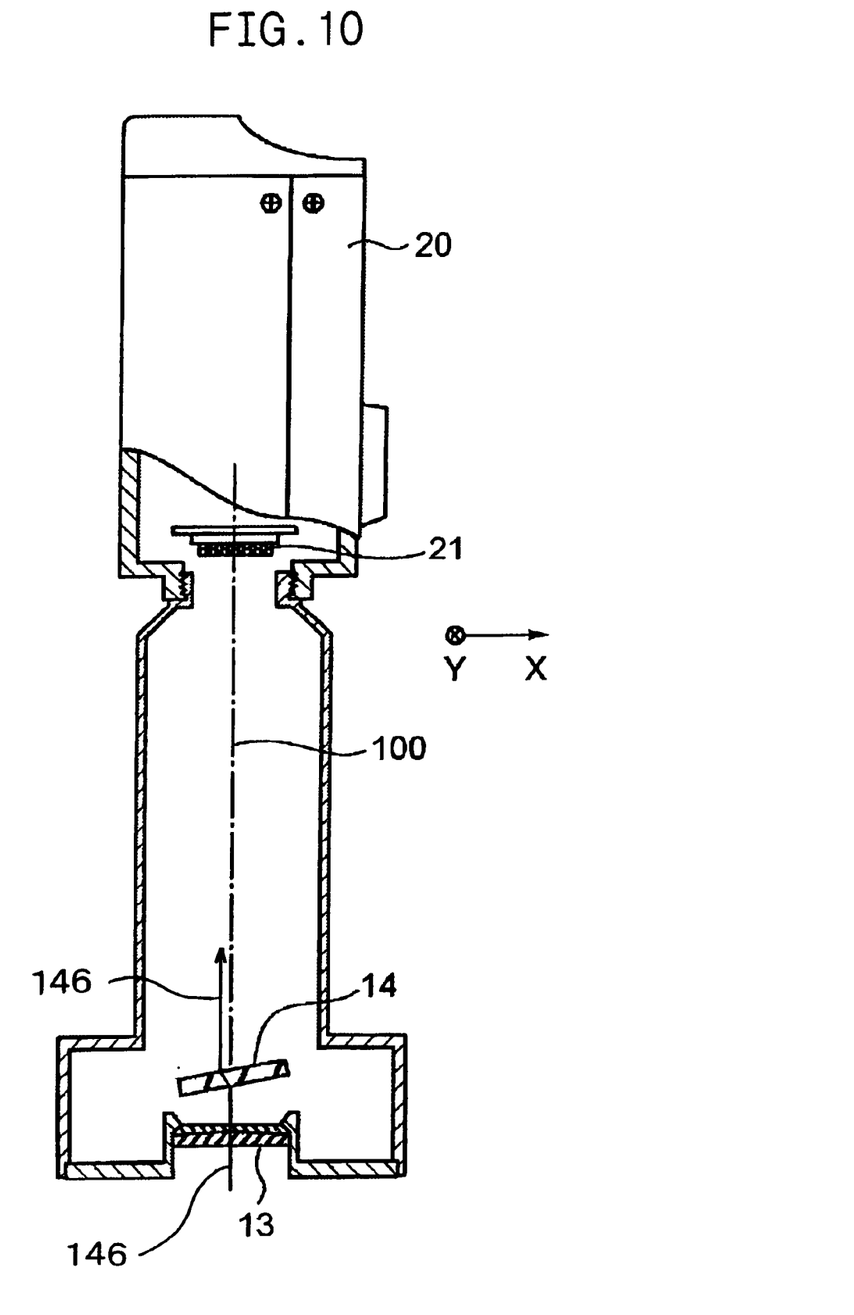
FIG. 10 is a cutaway sectional figure showing a parallel flat plate 14 which is disposed in a barrel 101 of the microscope system according to the fourth preferred embodiment of the present invention.
Figure 11:
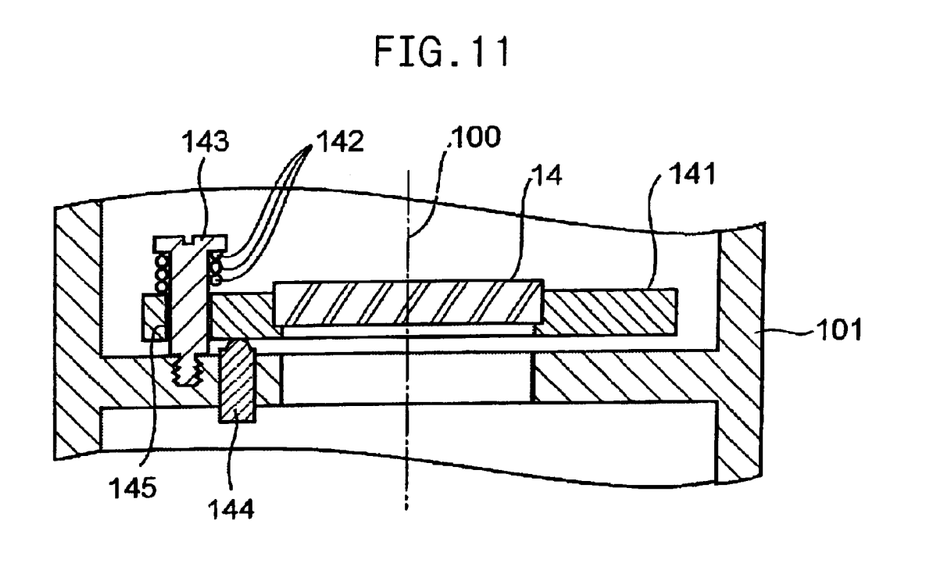
FIG. 11 is a sectional figure showing a mechanism for tilting the parallel flat plate 14 of FIG. 10.

A fourth preferred embodiment of the present invention will now be described with reference to FIGS. 10 and 11. This microscope system according to the fourth preferred embodiment has a structure which is the same as that of the first preferred embodiment, except for the feature that a parallel flat plate 14 is arranged upon the optical axis 100 between the focusing lens 13 and the CCD 21, and the position of the image which is focused upon the CCD 21 is shifted in the X and Y directions by tilting this parallel flat plate 14. In FIG. 10 the manner is shown in which the light flux (light beam or ray bundle) 146 from the specimen is shifted.

The parallel flat plate 14 is a transparent glass parallel flat plate of circular form which is supported by a frame 141. The frame 141 is provided around its circumference with three through holes 145, and the frame 141 is fitted into the barrel 101 by screws 143 which are inserted in these through holes 145. Springs 142 are fitted over the screws 143, and these springs 142 bias the frame 141 towards the direction of the focusing lens 13. Furthermore, piezo elements 144 are respectively arranged in the barrel 101 at positions somewhat towards the optical axis 100 from the three through holes 145 in the frame 141. Accordingly it is possible to press upwards at these three places upon the frame 141 by any amounts desired by extending these three piezo elements 144, so that it is possible to tilt the parallel flat plate 14 in any desired direction. By doing this, it is possible to shift the position of the image which is focused upon the CCD 21 in the X and Y directions by any desired amount.

In other words, this fourth preferred embodiment takes advantage of the difference between the index of refraction of the glass from which the parallel flat plate 14 is formed and the index of refraction of the surrounding air.

Accordingly, with the structure of this fourth preferred embodiment of the present invention, up through the step 89 of the flow chart of FIG. 8, the operation is the same as in the first preferred embodiment; but, in the step 90, the calculation processing section 52 calculates tilt angles for the parallel flat plate 14 in the X and Y directions in order to shift the image upon the CCD 21 by just the shift amounts XΔ and YΔ, determines amounts of extension for three piezo elements 144 for applying these tilt angles, and extends the piezo elements 144 by just these extension amounts. By doing this, the observation image upon the CCD 21 is shifted by just the shift amounts XΔ and YΔ. Thus, it is possible for an image centered upon the target position (xd, yd) which has been inputted by the observer to be projected upon the monitor 40.

It should be understood that the tilt angles for the parallel flat plate 14 are calculated in consideration of the thickness and the index of refraction of the parallel flat plate 14.

With the above described first through fourth preferred embodiments of the present invention, not only the positioning operation when displaying an image of the desired coordinates upon the specimen is performed upon the object plane side (the stage side), but also final positioning is performed by applying adjustment or correction upon the image plane. Due to this it is possible to apply corrections comparatively simply, even with difficult positioning which is minute upon the object plane side, since they are magnified upon the image plane side because magnification is applied. Accordingly, as a result, it is possible to implement high accuracy and also high speed positioning, since it is possible to ensure high positioning accuracy even if the positioning at the object plane is quite rough. In particular, with the structure of the first preferred embodiment, it is possible to enhance the speed and the reliability especially effectively, since no mechanical moving parts at all are employed during the adjustment at the image plane side.

It should be understood that, although in the above description of the first through fourth preferred embodiments of the present invention structures for the microscope system were explained in which the microscope 10, the TV camera 20, and the electrically driven stage 30 were each provided as a separate independent component and were all individually connected to the control device 50, the present invention is not to be considered as being limited to this structure; it would also be possible for the microscope system to be implemented with a structure in which the control device 50 is housed within the microscope 10, and the TV camera 20 and the electrically driven stage 30 are formed integrally with the microscope 10.

Furthermore, although in the first preferred embodiment of the present invention the stepping motors 31 and 32 were used as drive sources for the electrically driven stage 30, it would also be possible to use DC motors. In such a case, it would be desirable to perform closed loop control with shifting while detecting the present position with the linear encoders 122 and 123.

The above described embodiments are examples, and various modifications can be made without departing from the spirit and scope of the invention.

What is claimed is:

1. A microscope system, comprising:
   a stage that shifts a specimen in x and y directions;
   a detection section that detects a position of the stage after shifting;
   a reception section that receives an input of a shift target position for the stage inputted by an observer;
   an optical system that forms a light flux into a focused and magnified image of the specimen;
   an image capturing section that captures the magnified image; and
   a shift section that, if the position detected by the detection section and the shift target position received by the reception section do not agree with one another, shifts a relative positional relationship between the light flux and the image capturing section.

2. A microscope system, comprising:
   an optical system that forms a magnified image of a specimen;
   an image capturing device that captures the magnified image of the specimen;
   a display device that displays the magnified image of the specimen that has been captured;
   an input device upon which an observer can designate a shift target point on the magnified image of the specimen that is to be shifted to a specified position upon a display screen of the display device;
   a stage device that shifts the specimen in x and y directions;
   a shift device that shifts the magnified image on an image side so that the magnified image shifts upon the display screen of the display device; and
   a control device that, when the shift target point has been designated by the input device, controls the stage device and the shift device so that the shift target point shifts to the specified position upon the display screen of the display device.

3. A microscope system according to claim 2, wherein when the shift target point has been designated by the input device, the control device controls the stage device so that the shift target point shifts to the specified position upon the display screen of the display device, and further, after this shifting of the specimen by the stage device, if error is still present between the shift target point and the specified position upon the display screen of the display device, controls the shift device so that the shift target point shifts towards the specified position upon the display screen of the display device by an amount of the error.

4. A microscope system according to claim 3, further comprising
   a detection device that detects the position of a stage of the stage device, wherein
   the control device calculates the error based upon the detection result from the detection device.

5. A microscope system according to claim 4, wherein the detection device comprises a linear encoder.

6. A microscope system according to claim 2, wherein:
   the image capturing device comprises an effective pixel range and a display pixel range used for display that is included within the effective pixel range; and
   the shift device shifts the display pixel range of the image capturing section within the effective pixel range.

7. A microscope system according to claim 2, wherein the shift device physically shifts the image capturing device itself in x and y directions.

8. A microscope system according to claim 2, wherein:
   the optical system comprises a focusing lens; and
   the shift device shifts the focusing lens in x and y directions.

9. A microscope system according to claim 2, wherein the shift device comprises a transparent parallel flat plate that is disposed between the specimen and the image capturing device, and tilts the parallel flat plate with respect to an optical axis.

* * * * *